(12) United States Patent
Kaneko et al.

(10) Patent No.: US 9,429,057 B2
(45) Date of Patent: Aug. 30, 2016

(54) METHOD AND AN APPARATUS FOR WARMING A CATALYST IN AN INTERNAL COMBUSTION ENGINE

(71) Applicant: TOYOTA JIDOSHA KABUSHIKI KAISHA, Toyota-shi, Aichi (JP)

(72) Inventors: Naoya Kaneko, Susono (JP); Daisuke Uchida, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/420,468

(22) PCT Filed: Apr. 24, 2014

(86) PCT No.: PCT/JP2014/002316
§ 371 (c)(1),
(2) Date: Feb. 9, 2015

(87) PCT Pub. No.: WO2014/196122
PCT Pub. Date: Dec. 11, 2014

(65) Prior Publication Data
US 2015/0218989 A1 Aug. 6, 2015

(30) Foreign Application Priority Data
Jun. 5, 2013 (JP) ................................. 2013-118766

(51) Int. Cl.
*F01N 3/20* (2006.01)
*F02D 41/02* (2006.01)
(Continued)

(52) U.S. Cl.
CPC ............... *F01N 3/2006* (2013.01); *F01N 9/00* (2013.01); *F02D 37/02* (2013.01); *F02D 41/025* (2013.01);
(Continued)

(58) Field of Classification Search
CPC ........ F01N 3/225; F01N 3/30; F01N 11/002; F01N 2430/06; F01N 2430/08; F01N 2560/06; F01N 2900/08; F01N 2900/1404; F01N 2900/1602; F02B 17/005; F02B 23/105; F02D 37/02; F02D 41/0245; F02D 41/3029; F02D 41/40; F02D 2041/389; F02D 2200/021; F02D 2200/0802
USPC .................. 60/285, 286, 289, 300, 304, 320
See application file for complete search history.

(56) References Cited

U.S. PATENT DOCUMENTS 5,992,143 A * 11/1999 Manaka ................ F02D 41/024
60/276
6,340,014 B1  1/2002 Tomita et al.
(Continued)

FOREIGN PATENT DOCUMENTS

JP   H05-79323 A    3/1993
JP   H11-324765 A  11/1999
(Continued)

*Primary Examiner* — Jorge Leon, Jr.
(74) *Attorney, Agent, or Firm* — Kenyon & Kenyon LLP

(57) ABSTRACT

An internal combustion engine which is provided with a fuel injector which injects fuel into a cylinder, an exhaust purification catalyst, and a secondary air feed device which feeds air to an engine exhaust passage. First catalyst warm-up control performs stratified combustion to retard an ignition timing, while second catalyst warm-up control feeds air to the engine exhaust passage. A first temperature range of engine cooling water at which the first catalyst warm-up control is performed and a second temperature range of engine cooling water at which the second catalyst warm-up control is performed are set. The second temperature range is set to be included inside the first temperature range.

6 Claims, 6 Drawing Sheets

(51) Int. Cl.

| | | |
|---|---|---|
| *F02D 41/14* | (2006.01) | |
| *F02D 37/02* | (2006.01) | |
| *F01N 9/00* | (2006.01) | |
| *F02D 41/04* | (2006.01) | |
| *F02D 41/38* | (2006.01) | |
| F02D 41/40 | (2006.01) | |
| F02B 17/00 | (2006.01) | |
| F02B 23/10 | (2006.01) | |
| F01N 3/30 | (2006.01) | |
| F01N 11/00 | (2006.01) | |
| F01N 3/22 | (2006.01) | |
| F02D 41/30 | (2006.01) | |

(52) U.S. Cl.
CPC ........... *F02D 41/0245* (2013.01); *F02D 41/04* (2013.01); *F02D 41/1446* (2013.01); *F02D 41/3023* (2013.01); *F02D 41/3076* (2013.01); *F02D 41/38* (2013.01); *F01N 3/225* (2013.01); *F01N 3/30* (2013.01); *F01N 11/002* (2013.01); *F01N 2430/06* (2013.01); *F01N 2430/08* (2013.01); *F01N 2550/14* (2013.01); *F01N 2560/06* (2013.01); *F01N 2610/06* (2013.01); *F01N 2900/08* (2013.01); *F01N 2900/1404* (2013.01); *F01N 2900/1602* (2013.01); *F01N 2900/1626* (2013.01); *F02B 17/005* (2013.01); *F02B 23/105* (2013.01); *F02D 41/3029* (2013.01); *F02D 41/40* (2013.01); *F02D 2041/389* (2013.01); *F02D 2200/021* (2013.01); *F02D 2200/0802* (2013.01); *Y02T 10/26* (2013.01); *Y02T 10/47* (2013.01)

(56) References Cited

U.S. PATENT DOCUMENTS

| | | | |
|---|---|---|---|
| 2003/0070423 A1* | 4/2003 | Morinaga | F01N 3/2006 60/284 |
| 2003/0074891 A1 | 4/2003 | Tamura et al. | |
| 2009/0077952 A1* | 3/2009 | Komuro | F01N 3/22 60/286 |
| 2010/0063662 A1 | 3/2010 | Harada et al. | |
| 2010/0083935 A1 | 4/2010 | Murase et al. | |

FOREIGN PATENT DOCUMENTS

| | | |
|---|---|---|
| JP | 2003-056392 A | 2/2003 |
| JP | 2004-108265 A | 4/2004 |
| JP | 2006-220020 A | 8/2006 |
| JP | 2008-208765 A | 9/2008 |
| JP | 2009-030459 A | 2/2009 |
| JP | 2009-030482 A | 2/2009 |
| JP | 2010-058746 A | 3/2010 |
| JP | 2010-112289 A | 5/2010 |
| JP | 2011-111895 A | 6/2011 |
| JP | 2012-036835 A | 2/2012 |

* cited by examiner

FIG. 1
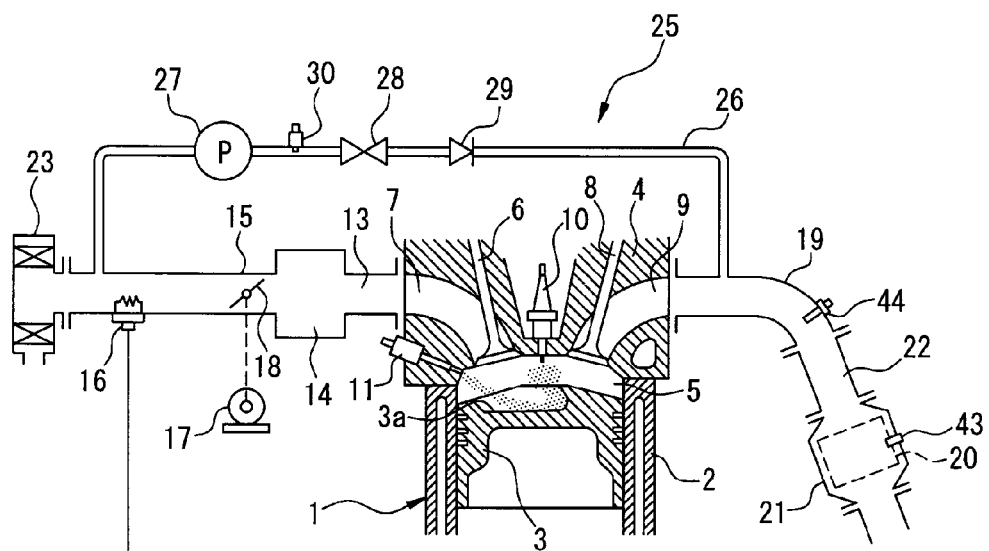
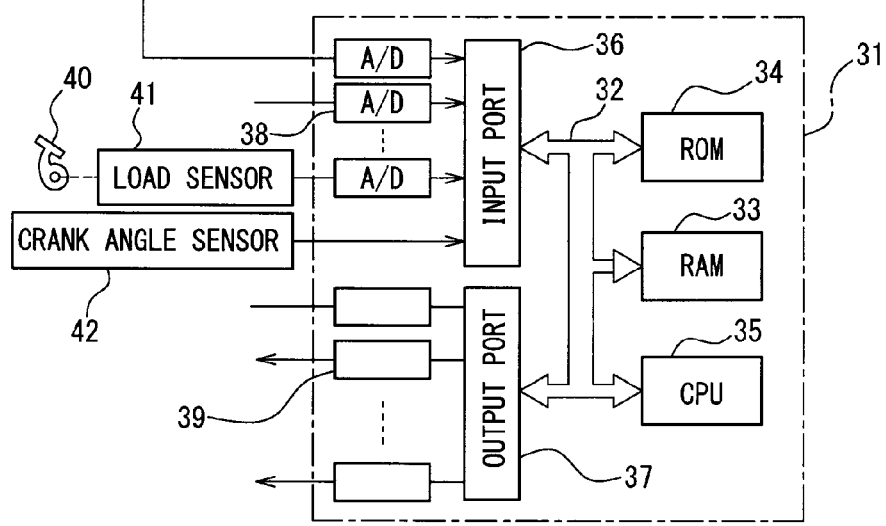

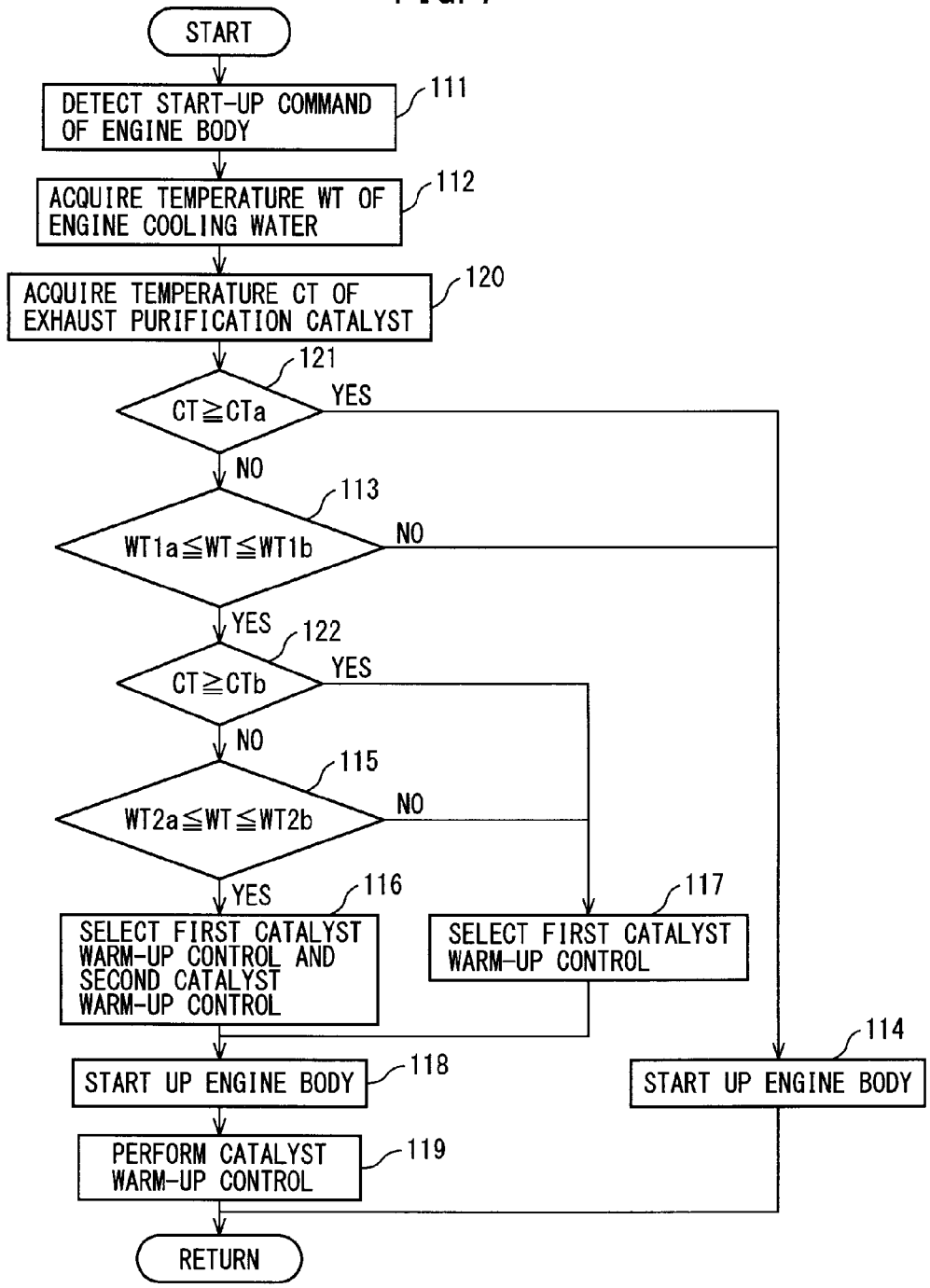

METHOD AND AN APPARATUS FOR WARMING A CATALYST IN AN INTERNAL COMBUSTION ENGINE

CROSS-REFERENCE TO RELATED APPLICATIONS

This is a national phase application based on the PCT International Patent Application No. PCT/JP2014/002316 filed Apr. 24, 2014, claiming priority to Japanese Patent Application No. 2013-118766 filed Jun. 5, 2013, the entire contents of both of which are incorporated herein by reference.

TECHNICAL FIELD

The present invention relates to an internal combustion engine.

BACKGROUND ART

It is known to arrange an exhaust purification catalyst in an engine exhaust passage of an internal combustion engine and remove carbon monoxide (CO), hydrocarbons (HC), nitrogen oxides ($NO_x$), and other components which are contained in the exhaust gas. The exhaust purification catalyst has an activation temperature at which it can remove these components of the exhaust gas with a high efficiency. Right after starting an internal combustion engine which has been shut down for a long period of time, the exhaust purification catalyst becomes less than the activation temperature. It is therefore preferable to raise the temperature of exhaust purification catalyst to the activation temperature or more early in time.

Japanese Patent Publication No. 11-324765A discloses a direct injection spark ignition internal combustion engine which warms up an exhaust purification catalyst from start-up of the internal combustion engine until the exhaust purification catalyst becomes activated. In this direct injection spark ignition internal combustion engine, when controlling an air-fuel ratio of an air-fuel mixture to a stoichiometric ratio for combustion, fuel is injected in a suction stroke to thereby form a homogeneous air-fuel mixture which is comparatively leaner than the stoichiometric air-fuel ratio in a combustion chamber as a whole. Further, fuel is injected in a compression stroke to form an air-fuel mixture layer which is comparatively richer than the stoichiometric air-fuel ratio around a spark plug. It is disclosed that this internal combustion engine is able to increase a ratio of CO contained in burnt gas and easily susceptible to an oxidation reaction and is able to lower an HC ratio. Further, it is disclosed to set the ignition timing at a retarded side.

Further, in the prior art, it is known to raise a temperature of an exhaust purification catalyst in a short time at the time of cold start-up etc. by arranging a secondary air feed device for feeding air to an engine exhaust passage at an upstream side of an exhaust purification catalyst (for example, Japanese Patent Publication No. 05-79323A). The secondary air feed device feeds secondary air to the engine exhaust passage to raise the oxygen concentration. The feed of secondary air causes the unburned carbon monoxide (CO) or hydrocarbons (HC) which are contained in the exhaust gas to oxidize and raise the temperature of the exhaust gas so as to promote warm-up of the exhaust purification catalyst.

Japanese Patent Publication No. 2003-056392A discloses an internal combustion engine which is provided with an injector which directly injects fuel into a combustion chamber and an air feeding means for feeding air inside an exhaust passage. It is disclosed that this internal combustion engine injects fuel in a compression stroke and makes a combustion air-fuel ratio a stoichiometric air-fuel ratio or an air-fuel ratio at the fuel rich side from the stoichiometric air-fuel ratio when using the air feeding means to feed air into the exhaust passage.

Japanese Patent Publication No. 2008-208765A discloses a spark ignition type internal combustion engine which is provided with a fuel injector which injects fuel into an engine intake passage wherein the internal combustion engine is provided with a catalyst which is arranged in an exhaust passage of the internal combustion engine, an over-advancing means for making the ignition timing overly advanced, and an oxygen feeding means for feeding oxygen to the exhaust upstream of the catalyst when the ignition timing is overly advanced. Japanese Patent Publication No. 2010-112289A discloses a control device of an internal combustion engine which is provided with a secondary air feed device wherein heat of a radiator etc. is introduced into the secondary air feed device to thaw out a frozen part of the secondary air feed device. Japanese Patent Publication No. 2011-111895A discloses a control device of an internal combustion engine which corrects an amount of discharge of a secondary air pump so that a temperature of the exhaust gas which flows into the catalyst becomes a suitable temperature.

CITATION LIST

Patent Literature

PTL 1: Japanese Patent Publication No. 11-324765A
PTL 2: Japanese Patent Publication No. 05-079323A
PTL 3: Japanese Patent Publication No. 2003-056392A
PTL 4: Japanese Patent Publication No. 2008-208765A
PTL 5: Japanese Patent Publication No. 2010-112289A
PTL 6: Japanese Patent Publication No. 2011-111895A

SUMMARY OF INVENTION

Technical Problem

As disclosed in the above publications, when warming up an exhaust purification catalyst at the time of start-up of an internal combustion engine etc., it is possible to directly inject fuel into a cylinder so as to cause stratified combustion and retard the ignition timing, and thereby make the temperature of the exhaust gas rise. Alternatively, it is possible to use a secondary air feed device to feed oxygen to the exhaust gas which flows out from a combustion chamber and oxidize the carbon monoxide etc. which is contained in the exhaust gas so as to make the temperature of the exhaust gas rise. By making the temperature of the exhaust gas rise, it is possible to make the exhaust purification catalyst rise in temperature in a short time.

In this regard, a secondary air feed device has the problem that, for example, when the engine is started up in an environment with an extremely low temperature of the outside air, the air pump or air switching valve etc. will be liable to freeze and start-up is liable to become impossible. Further, there are limits to the time of use of an air pump etc. If increasing the temperature range for driving the secondary air feed device, there is the problem that the secondary air feed device will fall in reliability. That is, there is the problem that the possibility will become greater of the secondary air feed device breaking down.

Further, in recent years, improvement of the properties of the exhaust gas which is released into the atmosphere has been further demanded. For example, it is preferable to reduce the amount of hydrocarbons etc. which are released into the atmosphere during the period when the exhaust purification catalyst is being warmed up. In this regard, with just the above control for causing stratified combustion in the cylinder so as to greatly retard the ignition timing or with just the above control for using the above secondary air feed device to feed oxygen to the exhaust gas, warm-up of the exhaust purification catalyst will take too much time and the properties of the exhaust gas will be hard to improve.

The present invention has as its object the provision of an internal combustion engine which is provided with an exhaust purification catalyst and secondary air feed device wherein the exhaust gas which is released into the atmosphere is improved in properties and wherein the secondary air feed device is improved in reliability.

Solution to Problem

The internal combustion engine of the present invention is provided with a cylinder fuel injector which injects fuel to an inside of a combustion chamber, an exhaust purification catalyst which is arranged in an engine exhaust passage, a secondary air feed device which feeds air to the engine exhaust passage at an upstream side from the exhaust purification catalyst, a related temperature acquisition device which acquires a related temperature which is a temperature of a part with which a temperature of the exhaust purification catalyst is linked, and a control device. The control device is formed so as to perform first catalyst warm-up control and second catalyst warm-up control which promote a rise in temperature of the exhaust purification catalyst. The first catalyst warm-up control includes control which injects fuel from the cylinder fuel injector in a compression stroke to make the fuel concentration around an ignition device rise and control which retards an ignition timing to make a temperature of exhaust gas which flows out from the combustion chamber rise. The second catalyst warm-up control includes control which feeds air to the engine exhaust passage to make the components which are included in the exhaust gas oxidize and make the temperature of the exhaust gas rise. A first temperature range of the related temperature at which the first catalyst warm-up control is performed and a second temperature range of the related temperature at which the second catalyst warm-up control is performed are preset in the control device. The second temperature range is set so as to be included inside the first temperature range and the range of performance of the first catalyst warm-up control is set broader than the range of performance of the second catalyst warm-up control.

In the above invention, the internal combustion engine can be formed so as to perform intermittent operational control which temporarily stops combustion of fuel in the combustion chamber during the operating period of the internal combustion engine and, when intermittent operational control is used to stop, then restart combustion in the combustion chamber, if the related temperature is lower than an upper limit of the first temperature range, a control device can perform first catalyst warm-up control without performing second catalyst warm-up control.

In the above invention, a lower limit of the related temperature at which intermittent operation is performed can be preset, and the lower limit of the related temperature at which intermittent operational control is performed can be set higher than an upper limit of the second temperature range.

In the above invention, the related temperature can be a temperature of engine cooling water, the related temperature acquisition device can include a temperature detector which detects the temperature of the engine cooling water, and a lower limit of the first temperature range can be set lower than a lower limit of the second temperature range, while an upper limit of the first temperature range can be set higher than an upper limit of the second temperature range.

In the above invention, the engine can be provided with a catalyst temperature acquisition device which acquires a temperature of the exhaust purification catalyst, an activation temperature at which the exhaust purification catalyst becomes activated can be preset in the control device, and the control device can prohibit the first catalyst warm-up control and second catalyst warm-up control when the exhaust purification catalyst is the activation temperature or more.

In the above invention, the engine can be provided with a catalyst temperature acquisition device which acquires a temperature of the exhaust purification catalyst, an activation temperature at which the exhaust purification catalyst becomes activated and a semiactivation temperature which is lower than the activation temperature and enables a predetermined purification rate to be achieved can be preset in the control device, and the control device can perform the first catalyst warm-up control without performing the second catalyst warm-up control when the related temperature is within a first temperature range and the temperature of the exhaust purification catalyst is less than the activation temperature and equal to or more than the semiactivation temperature.

Advantageous Effects of Invention

According to the present invention, it is possible to provide an internal combustion engine which is provided with an exhaust purification catalyst and secondary air feed device wherein the exhaust gas which is released into the atmosphere is improved in properties and wherein the secondary air feed device is improved in reliability.

BRIEF DESCRIPTION OF DRAWINGS

FIG. 1 is a schematic view of an internal combustion engine in an embodiment.

FIG. 7 is a flowchart of second operational control in an embodiment.

DESCRIPTION OF EMBODIMENTS

Figure 2:
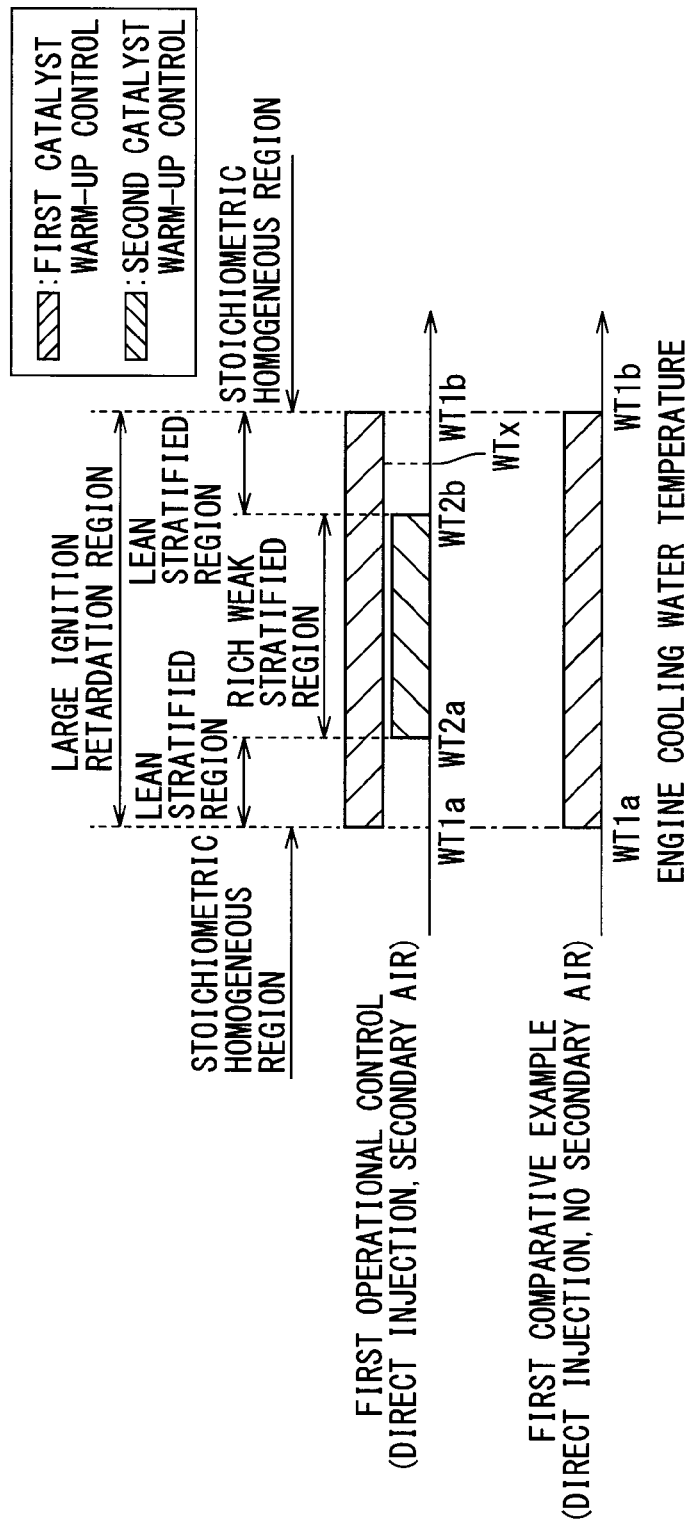
FIG. 2 is a schematic view which explains a range of performance of catalyst warm-up control in first operational control in an embodiment and a first comparative example.

Referring to FIG. 1 to FIG. 7, an internal combustion engine in an embodiment will be explained. In the present embodiment, an internal combustion engine which is installed in a vehicle will be used as an example for the explanation.

FIG. 1 is a schematic view of the internal combustion engine of the present embodiment. The internal combustion engine of the present embodiment is a spark ignition type. The internal combustion engine is provided with an engine body 1. The engine body 1 includes a cylinder block 2 and a cylinder head 4. Inside of the cylinder block 2, pistons 3 are arranged. Each piston 3 reciprocates inside of a bore which is formed in the cylinder block 2.

In the present embodiment, a space which is surrounded by a crown of a piston 3, the cylinder head 4, and a bore of the cylinder block 2 is called a "combustion chamber". A combustion chamber 5 is formed for each cylinder. Each combustion chamber 5 is connected to an engine intake passage and engine exhaust passage. The engine intake passage is a passage for feeding air or an air-fuel mixture of fuel and air to the combustion chamber 5. The engine exhaust passage is a passage for discharging exhaust gas which was produced by combustion of the fuel from the combustion chamber 5.

The cylinder head 4 is formed with intake ports 7 and exhaust ports 9. An intake valve 6 is arranged at the end part of each intake port 7 and is formed to be able to open and close the engine intake passage which communicates with the combustion chamber 5. An exhaust valve 8 is arranged at an end part of each exhaust port 9 and is formed to be able to open and close the engine exhaust passage which communicates with the combustion chamber 5. The cylinder head 4 has ignition devices constituted by spark plugs 10 fastened to it.

The internal combustion engine of the present embodiment is provided with a fuel injector 11 serving as a cylinder fuel injector which injects fuel to the inside of each combustion chamber 5. The fuel injector 11 directly injects fuel into a cylinder. The internal combustion engine of the present embodiment feeds fuel which was stored in a fuel tank to the fuel injector 11 by a high pressure fuel pump. At the top surface of each piston 3, a cavity 3a is formed which extends from below the fuel injector 11 to below the spark plug 10. By injecting fuel from the fuel injector 11 in the compression stroke, an air-fuel mixture which contains fuel flows along the cavity 3a. The fuel gathers near the spark plug 10 whereby the concentration of fuel can be raised. That is, it is possible to raise the stratification degree.

The intake port 7 of each cylinder is connected through a corresponding intake runner 13 to a surge tank 14. The surge tank 14 is connected through an intake duct 15 to an air cleaner 23. Inside the intake duct 15, an air flowmeter 16 which detects the intake air amount is arranged. Inside the intake duct 15, further, a throttle valve 18 which is driven by a step motor 17 is arranged. On the other hand, the exhaust port 9 of each cylinder is connected to an exhaust manifold 19. The exhaust manifold 19 is connected through an exhaust pipe 22 to an exhaust treatment device 21. The exhaust treatment device 21 in the present embodiment includes an exhaust purification catalyst 20. As the exhaust purification catalyst 20, any catalyst which has an activation temperature for achieving a predetermined purification rate can be employed. For example a three-way catalyst, oxidation catalyst, $NO_x$ removal catalyst, or other catalyst may be employed.

In the internal combustion engine of the present embodiment, an electronic control unit 31 which functions as the control device is provided. The electronic control unit 31 in the present embodiment includes a digital computer. The electronic control unit 31 includes components which are mutually connected through a bidirectional bus 32 such as a RAM (random access memory) 33, ROM (read only memory) 34, CPU (microprocessor) 35, input port 36, and output port 37.

An output signal of the air flowmeter 16 is input through a corresponding AD converter 38 to the input port 36. An accelerator pedal 40 is connected to a load sensor 41. The load sensor 41 generates an output voltage which is proportional to the amount of depression of the accelerator pedal 40. This output voltage is input to the input port 36 through a corresponding AD converter 38.

A crank angle sensor 42, for example, generates an output pulse each time a crankshaft rotates by a predetermined angle. This output pulse is input to the input port 36. The output of the crank angle sensor 42 can be used to detect the engine speed. Further, the output of the crank angle sensor 42 can be used to detect the crank angle at any time.

If referring to the ratio of the air and fuel (hydrocarbons) in the gas which includes the gas which was burned in a combustion chamber 5 and which is fed to the engine exhaust passage etc. upstream of the exhaust treatment device 21 as "the air-fuel ratio (A/F) of the exhaust gas", the engine exhaust passage is provided with an air-fuel ratio sensor 44 which detects the air-fuel ratio of the exhaust gas which flows out from the combustion chamber 5. Further, at the exhaust treatment device 21, a temperature sensor 43 is arranged as a temperature detector which detects the temperature of the exhaust purification catalyst 20. The temperature sensor 43 functions as a catalyst temperature acquisition device which acquires the temperature of the exhaust purification catalyst 20. The output of the air-fuel ratio sensor 44 and the output of the temperature sensor 43 are input through corresponding AD converters 38 to the input port 36.

The output port 37 of the electronic control unit 31 is connected through corresponding drive circuits 39 to the fuel injectors 11 and spark plugs 10. The electronic control unit 31 in the present embodiment is formed so as to perform fuel injection control and ignition control. That is, the timings of injection of fuel from the fuel injectors 11 and the amounts of injection of fuel are controlled by the electronic control unit 31. Furthermore, the ignition timings of the spark plugs 10 are controlled by the electronic control unit 31. Further, the output port 37 is connected through a corresponding drive circuit 39 to a step motor 17 which drives a throttle valve 18. The step motor 17 is controlled by the electronic control unit 31.

The internal combustion engine of the present embodiment is provided with a secondary air feed device 25 which feeds air to the engine exhaust passage at the upstream side from the exhaust purification catalyst 20. The secondary air feed device 25 includes a secondary air feed passage 26 which connects the intake duct 15 and the exhaust manifold 19. The secondary air feed passage 26 is connected to the intake duct 15 at the downstream side of the air cleaner 23 and the upstream side of the air flowmeter 16. Further, the secondary air feed device 25 includes an electric motor driven type air pump 27 and air switching valve (ASV) 28. The air pump 27 pressurizes the air inside of the intake duct 15 and feeds it to the exhaust manifold 19. Further, at the secondary air feed passage 26, a check valve 29 is arranged for preventing backflow of air. Between the air pump 27 and the air switching valve 28, a pressure sensor 30 which detects the pressure inside of the secondary air feed passage 26 is arranged.

The output of the pressure sensor 30 is input to the electronic control unit 31. Further, the output port 37 of the electronic control unit 31 is connected through the corresponding drive circuits 39 to the air pump 27 and air switching valve 28. In this way, the secondary air feed device 25 is controlled by the electronic control unit 31.

The secondary air feed device 25 in the present embodiment is, for example, used in a state where the exhaust purification catalyst 20 is not sufficiently raised in temperature at the time of cold start-up of the internal combustion engine etc. When the conditions for start-up of the secondary air feed device 25 stand, the air switching valve 28 is opened and the air pump 27 is driven. Part of the air which passes through the air cleaner 23 passes through the secondary air feed passage 26 to be fed to the inside of the exhaust manifold 19. Oxygen is fed to the exhaust gas which flows through the exhaust manifold 19.

The exhaust gas which flows out from each combustion chamber 5 contains unburned hydrocarbons and carbon monoxide. The exhaust gas which flows out from the combustion chamber 5 is high in temperature. By using the secondary air feed device to feed oxygen, it is possible to make the unburned hydrocarbons and carbon monoxide oxidize. Due to the heat of oxidation at this time, the temperature of the exhaust gas can be made to rise. It is possible to feed high temperature exhaust gas to the exhaust purification catalyst 20 to promote the rise in temperature of the exhaust purification catalyst 20.

Alternatively, when the exhaust purification catalyst 20 has an oxidation function, it is possible to feed air to the exhaust gas to make the air-fuel ratio of the exhaust gas lean (more than stoichiometric air-fuel ratio) and feed this to the exhaust purification catalyst 20. It is possible to oxidize the unburned hydrocarbons and carbon monoxide at the exhaust purification catalyst 20 and promote the rise in temperature of the exhaust purification catalyst 20.

The internal combustion engine of the present embodiment performs first catalyst warm-up control and second catalyst warm-up control for promoting a rise in the temperature of the exhaust purification catalyst 20. Referring to FIG. 1, in the first catalyst warm-up control, fuel is injected from the fuel injector 11 in the compression stroke of the combustion cycle. At this time, fuel is injected at a timing at which fuel collects around the spark plug 10. The concentration of fuel rises around the spark plug 10. In this way, a stratified state is formed for ignition. That is, stratified combustion is performed. Furthermore, by performing stratified combustion, the ignitable time period by the spark plug 10 becomes longer and the ignition timing in the combustion chamber 5 is controlled to be greatly retarded. Control is performed to retard the ignition timing at the time of ordinary operation or before performing the first catalyst warm-up control. By performing this control, it is possible to make the temperature of the exhaust gas which flows out from a combustion chamber 5 rise.

Further, in the second catalyst warm-up control of the present embodiment, the secondary air feed device 25 is driven. By driving the secondary air feed device 25, it is possible to feed air to the exhaust manifold 19. It is possible to cause the carbon monoxide or hydrocarbons which are contained in the exhaust gas to oxidize and make the temperature of the exhaust gas rise.

The internal combustion engine of the present embodiment performs control to simultaneously perform the first catalyst warm-up control and second catalyst warm-up control. When simultaneously performing the first catalyst warm-up control and second catalyst warm-up control, stratified combustion is performed in a combustion chamber 5 and fuel is injected so that the air-fuel ratio of the exhaust gas which flows out from the combustion chamber 5 becomes rich (less than stoichiometric air-fuel ratio). For example, fuel is injected so that the air-fuel ratio at the time of combustion in the combustion chamber 5 as a whole becomes rich. In the present embodiment, fuel is injected from the fuel injector 11 in the compression stroke and fuel is injected from the fuel injector 11 in the suction stroke. By using the secondary air feed device 25 to feed oxygen to the exhaust gas, it is possible to cause an oxidation reaction of the carbon monoxide or unburned hydrocarbons which flow out from the combustion chamber 5 and raise the temperature of the exhaust gas.

Here, fuel is injected in the compression stroke by a timing and amount by which a weak stratified state is formed around a spark plug. If the concentration of the fuel around the spark plug 10 becomes too high, ignition is liable to not be possible. That is, if the rich degree around a spark plug 10 is too high, ignition becomes difficult. However, a weak stratified state can be formed around a spark plug 10 so as to cause ignition. Further, it is possible to greatly retard the ignition timing. By retarding the ignition timing, it is possible to make the temperature of the exhaust gas which flows out from a combustion chamber 5 rise.

The combustion state when performing the first catalyst warm-up control and stopping the second catalyst warm-up control is referred to as a "stratified lean" state. The air-fuel ratio of a combustion chamber 5 as a whole is equal to the average air-fuel ratio when making the air-fuel mixture in the combustion chamber 5 homogeneous. In a medium size and small size internal combustion engine, the air-fuel ratio of a combustion chamber 5 as a whole at the time of a stratified lean state is for example 15 to 16 or lean. Further, the air-fuel ratio around a spark plug 10 is for example 13 to 14 or rich. On the other hand, the combustion state when performing the first catalyst warm-up control and second catalyst warm-up control is referred to as the "weak stratified rich" state. The air-fuel ratio of a combustion chamber 5 as a whole at the time of a weak stratified rich state is for example 12 to 13 or rich. The air-fuel ratio around a spark plug 10 is, for example, 8 to 11 or rich. In control which greatly retards the ignition timing, control is performed to greatly retard the ignition timing compared with the idling state after catalyst warm-up control has ended. With control for greatly retarding the ignition timing, for example, ignition is possible in the range of after top dead center (ATDC) 10 to 20 degrees.

Here, a medium size and small size internal combustion engine has, for example, a displacement of 3 liters or less. When it comes to a larger size internal combustion engine where the displacement is larger than 3 liters, sometimes the air-fuel ratio of a combustion chamber 5 as a whole is set to the somewhat rich side. That is, if the internal combustion engine becomes large in size, sometimes it is set so that the concentration of fuel becomes denser. For example, in a six-cylinder or eight-cylinder or other large sized engine, the displacement becomes large. In this case, for example, the air-fuel ratio of a combustion chamber 5 as a whole when the state of combustion is a stratified lean state is set to a region of 14.6 to 16. Further, the air-fuel ratio of a combustion chamber 5 as a whole when the state of combustion is a weak stratified rich state is set to 10 to 14.

In this way, by simultaneously performing both the first catalyst warm-up control and the second catalyst warm-up control, it is possible to feed high temperature exhaust gas to the exhaust purification catalyst 20 and possible to warm up the exhaust purification catalyst 20 in a short time. As a result, it is possible to shorten the time when the exhaust purification catalyst 20 is in a state less than the activation temperature and shorten the time when the properties of the exhaust gas deteriorate. For this reason, the amount of release of components which are contained in the exhaust gas and should be removed can be reduced. For example, when the exhaust purification catalyst 20 has an oxidation function, it is possible to reduce the amount of hydrocarbons which are released to the outside during the period of catalyst warm-up control.

FIG. 2 is a schematic view which explains a first operational control of the present embodiment and a first comparative example. In the operational control in the present embodiment, the temperature of a part with which the temperature of the exhaust purification catalyst 20 is linked, defined as the "related temperature", is used as the basis for catalyst warm-up control. As the related temperature, the temperature of a part where the more the temperature of that part rises, the more the temperature of the exhaust purification catalyst 20 rises may be employed. In the present embodiment, as the related temperature, the temperature of the engine cooling water is employed. The temperature of the engine cooling water is linked with the temperature of the engine body 1, while the temperature of the exhaust purification catalyst 20 is linked with the temperature of the engine body 1. For this reason, the more the temperature of the engine cooling water rises, the more the temperature of the exhaust purification catalyst 20 rises.

Further, the internal combustion engine is provided with a related temperature acquisition device which detects the related temperature. The related temperature acquisition device in the present embodiment includes a temperature detector which is arranged in the flow path of the engine cooling water for detecting the temperature of the engine cooling water. The output of the temperature detector is input to the electronic control unit 31.

In the operational control of the present embodiment, the range of performances of the first catalyst warm-up control and the second catalyst warm-up control are preset based on the temperature of the engine cooling water. In FIG. 2, the abscissa shows the temperature of the engine cooling water. In the first operational control, a first temperature range of the temperature of the engine cooling water at which the first catalyst warm-up control is performed and a second temperature range of the temperature of the engine cooling water at which the second catalyst warm-up control is performed are preset.

The first temperature range at which the first catalyst warm-up control is performed is set to the temperature WT1a to the temperature WT1b. Further, the second temperature range at which the second catalyst warm-up control is performed is set to the temperature WT2a to the temperature WT2b. In the internal combustion engine of the present embodiment, there is a temperature range of the engine cooling water at which the first catalyst warm-up control and the second catalyst warm-up control are simultaneously performed. In the first operational control, when the temperature of the engine cooling water is in the second temperature range, the first catalyst warm-up control and the second catalyst warm-up control are simultaneously performed.

When cold starting an internal combustion engine, the temperature of the engine cooling water gradually rises right after start-up. When the temperature of the engine cooling water is less than the temperature WT1a, without performing the first catalyst warm-up control and second catalyst warm-up control, the normal operating state is continued to raise the temperature of the exhaust purification catalyst 20. The temperature of the engine cooling water is less than the temperature WT1a, for example, in the state where the temperature of the outside air is extremely low. In such a state, control is performed to give priority to reliably making the fuel burn in a combustion chamber 5 and catalyst warm-up control is not performed. The combustion state in a combustion chamber 5 is, for example, controlled so that the air-fuel mixture is homogeneous in state and the air-fuel ratio at the time of combustion becomes the stoichiometric air-fuel ratio.

In the temperature range where the temperature of the engine cooling water is not less than the temperature WT1a and less than the temperature WT2a, the first catalyst warm-up control is performed. Further, the first catalyst warm-up control is performed in the temperature range where the temperature of the engine cooling water is higher than the temperature WT2b and not more than the temperature WT1b. In these cases, second catalyst warm-up control is stopped. When performing the first catalyst warm-up control, the air-fuel ratio at the time of combustion in the combustion chamber 5 is made a lean state. The air-fuel ratio of the exhaust gas which flows out from the combustion chamber 5 also becomes lean. Furthermore, in the compression stroke, fuel is injected from the fuel injector 11 to form a stratified state for combustion. Further, the ignition timing can be greatly retarded to make the temperature of the exhaust gas rise.

In the temperature range where the temperature of the engine cooling water is not less than the temperature WT2a and not more than the temperature WT2b, the first catalyst warm-up control and second catalyst warm-up control are performed. The air-fuel ratio at the time of combustion in a combustion chamber 5 as a whole is controlled to become rich and a weak stratified state is formed for combustion. Further, the ignition timing is greatly retarded. Furthermore, the secondary air feed device 25 is driven to feed air to the engine exhaust passage. The carbon monoxide and hydrocarbons which are contained in the exhaust gas which flows out from the combustion chamber 5 can be oxidized.

In the temperature range where the temperature of the engine cooling water is higher than the temperature WT1b, both the first catalyst warm-up control and second catalyst warm-up control are stopped. In this temperature range, the temperature of the exhaust purification catalyst 20 becomes sufficiently high. For example, in the temperature range higher than the temperature WT1b, it is possible to judge that the exhaust purification catalyst 20 has reached the activation temperature or more. In this temperature range, the internal combustion engine becomes the normal operating state, the air-fuel mixture in a combustion chamber 5 is controlled to become homogeneous in state, and, furthermore, the air-fuel ratio at the time of combustion is controlled to become the stoichiometric air-fuel ratio.

In this way, in the first operational control of the present embodiment, the second temperature range is set to be included inside of the first temperature range. The range of performance of the first catalyst warm-up control is set broader than the range of performance of the second catalyst warm-up control. In the present embodiment, the lower limit of the first temperature range of the first catalyst warm-up control is set lower than the lower limit of the second temperature range of the second catalyst warm-up control. That is, the temperature WT1a is set lower than the temperature WT2a. Further, the upper limit of the first temperature range is set higher than the upper limit of the second temperature range. That is, the temperature WT1b is set higher than the temperature WT2b.

FIG. 2 shows not only the first operational control of the present embodiment but also a first comparative example. The first comparative example is an example of control of an internal combustion engine which is a direct injection type which directly injects fuel into a combustion chamber and which is not provided with a secondary air feed device. Warm-up control of the exhaust purification catalyst is performed only by the first catalyst warm-up control. The temperature range of the engine cooling water at which the catalyst warm-up control of the first comparative example is performed is substantially the same as the temperature range of the engine cooling water at which the first operational control is performed.

In the first operational control of the present embodiment, in the region where the engine cooling water is not less than the temperature WT2a and not more than the temperature WT2b, it is possible to perform not only the first catalyst warm-up control, but also the second catalyst warm-up control. For this reason, it is possible to raise the temperature of the exhaust purification catalyst in a shorter time than the first comparative example. That is, it is possible to make the exhaust purification catalyst the activation temperature or more in a shorter time than the first comparative example.

Figure 3:
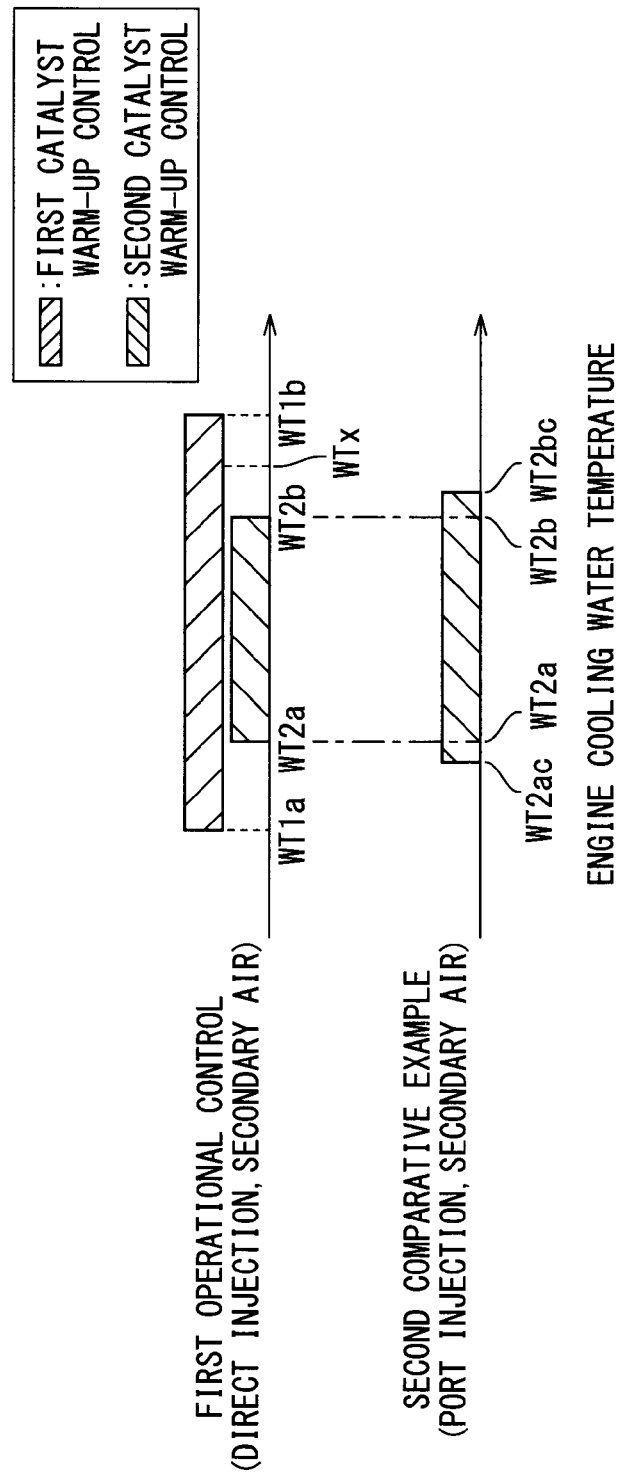
FIG. 3 is a schematic view which explains a range of performance of catalyst warm-up control in first operational control in an embodiment and a second comparative example.

FIG. 3 is a schematic view of the first operational control and second comparative example of the present embodiment. In the second comparative example, the fuel injectors are arranged so as to inject fuel into the engine intake passage. The internal combustion engine of the second comparative example is, for example, a port injection type internal combustion engine. Further, the internal combustion engine of the second comparative example is provided with a secondary air feed device.

In an internal combustion engine which performs port injection, inside of a combustion chamber, the air-fuel mixture is homogeneous in state. That is, homogeneous combustion is performed. When driving a secondary air feed device for performing second catalyst warm-up control, fuel is injected so that the air-fuel ratio at the time of combustion in the combustion chamber becomes rich. The exhaust gas which flows out from the combustion chamber also becomes rich in air-fuel ratio.

In this regard, the secondary air feed device 25 is susceptible to freezing of the air pump etc. in an extremely low temperature state. If left frozen, the secondary air feed device 25 is liable to not operate normally or the air pump etc. of the secondary air feed device 25 is liable to break down. The second temperature range where the second catalyst warm-up control is performed is small, so the lower limit of the second temperature range becomes higher than the lower limit of the first temperature range where the first catalyst warm-up control is performed.

In the second comparative example, to broaden the temperature range for performing catalyst warm-up control even a little, the second catalyst warm-up control is performed in the range of the temperature WT2ac to the temperature WT2bc. As opposed to this, in the first operational control of the present embodiment, the first catalyst warm-up control is added, so the lower limit of the second temperature range for performing the second catalyst warm-up control can be made higher than the second comparative example. That is, the temperature range for operating the secondary air feed device 25 can be made narrower than the second comparative example. For this reason, it is possible to reduce the probability of the secondary air feed device 25 not operating normally or trouble occurring. Further, since the temperature range for driving the secondary air feed device 25 becomes narrower, it is possible to reduce the driving time of the air pump and air switching valve and possible to suppress trouble in the secondary air feed device 25 and improve reliability.

Further, when starting or stopping the secondary air feed device 25, noise or vibration occur. By making the temperature range in which the secondary air feed device 25 is driven narrower, the number of times by which the secondary air feed device 25 is started can be reduced and noise and vibration can be suppressed.

Furthermore, when driving the secondary air feed device 25, the air-fuel ratio of the exhaust gas which flows into the exhaust purification catalyst 20 becomes lean. If the exhaust purification catalyst 20 has an oxidation function, an oxidation reaction is caused on the exhaust purification catalyst 20 and the exhaust purification catalyst 20 gradually deteriorates. By making the temperature range for driving the secondary air feed device 25 narrower, it is possible to suppress deterioration of the exhaust purification catalyst 20 due to an oxidation reaction at the time of catalyst warm-up control.

Regarding the upper limit of the second temperature range for performing the second catalyst warm-up control as well, the first operational control of the present embodiment can set this lower than the second comparative example. The temperature range for driving the secondary air feed device 25 can therefore be made narrower.

In the first operational control of the present embodiment, the temperature range in which the catalyst warm-up control can be performed becomes larger than the second comparative example and the temperature of the exhaust purification catalyst 20 can be raised in a shorter time than the second comparative example. Furthermore, there is a temperature range where the first catalyst warm-up control and the second catalyst warm-up control are simultaneously performed, so it is possible to raise the temperature of the exhaust purification catalyst in a shorter time than the second comparative example as well.

In this way, in the internal combustion engine of the present embodiment, it is possible to raise the temperature of the exhaust purification catalyst 20 in a short time and possible to improve the properties of the exhaust gas which is released to the outside. Further, the secondary air feed device 25 is improved in reliability.

In this regard, the internal combustion engine of the present embodiment is formed so as to perform intermittent operational control which temporarily stops the combustion of fuel in a combustion chamber during the operating period. As the intermittent operational control, for example, there is included control which makes the idling operation stop when the internal combustion engine is mounted in a vehicle and the vehicle stops at a red light etc. The combustion of the fuel in the combustion chamber is temporarily stopped and the engine speed becomes zero. The internal combustion engine detects the operation of the driver of driving the vehicle forward and restarts the combustion in the combustion chambers.

Referring to FIG. 2, the internal combustion engine which performs intermittent operational control has the lower limit temperature of the related temperature for performing intermittent operational control. In the present embodiment, intermittent operational control is allowed when the engine cooling water is the temperature WTx or more, while intermittent operational control is prohibited when it is less than the temperature WTx. When the temperature of the engine cooling water is less than the temperature WTx, for example, the temperature of the exhaust purification catalyst 20 is not sufficiently high. Accordingly, if repeatedly starting and stopping the combustion at the combustion chamber 5, the properties of the exhaust gas which is released into the atmosphere will deteriorate. In particular, when restarting, the properties of the exhaust gas are liable to deteriorate by a control in which the air-fuel ratio at the time of combustion is made to be rich. A minimum temperature enabling intermittent operational control is set.

In the present embodiment, the temperature WTx of the lower limit of the engine cooling water at which intermittent operational control is preformed is set higher than the temperature WT2b of the upper limit of the second temperature range. When stopping, then restarting combustion in the combustion chambers due to intermittent operational control, if the temperature of the engine cooling water is lower than the upper limit of the first temperature range, the first catalyst warm-up control is performed without the second catalyst warm-up control being performed.

If the second catalyst warm-up control is performed when the engine body 1 is temporarily stopped, then restarted, the secondary air feed device 25 is repeatedly started up and stopped. For this reason, the number of times the secondary air feed device 25 is started up and stopped increases and the secondary air feed device 25 falls in reliability. Further, in the second catalyst warm-up control, control is performed so that the air-fuel ratio of the exhaust gas becomes rich, so deviation of the air-fuel ratio at the time of combustion occurs at the time of restart of the engine body and the properties of the exhaust which is released into the atmosphere are liable to deteriorate.

In the present embodiment, when restarting combustion in the combustion chambers 5, if the temperature of the engine cooling water is lower than the upper limit of the first temperature range, only the first catalyst warm-up control is performed. Further, the lower limit of the temperature of the engine cooling water at which the intermittent operational control is performed is set higher than the upper limit of the second temperature range. Due to this control, the secondary air feed device 25 can be kept from being repeatedly started up and stopped and the secondary air feed device 25 is improved in reliability. Further, in the operating region where the engine body 1 is restarted, the air-fuel ratio of the exhaust gas is controlled to be lean, so deterioration of the properties of the exhaust gas can be suppressed.

Figure 4:
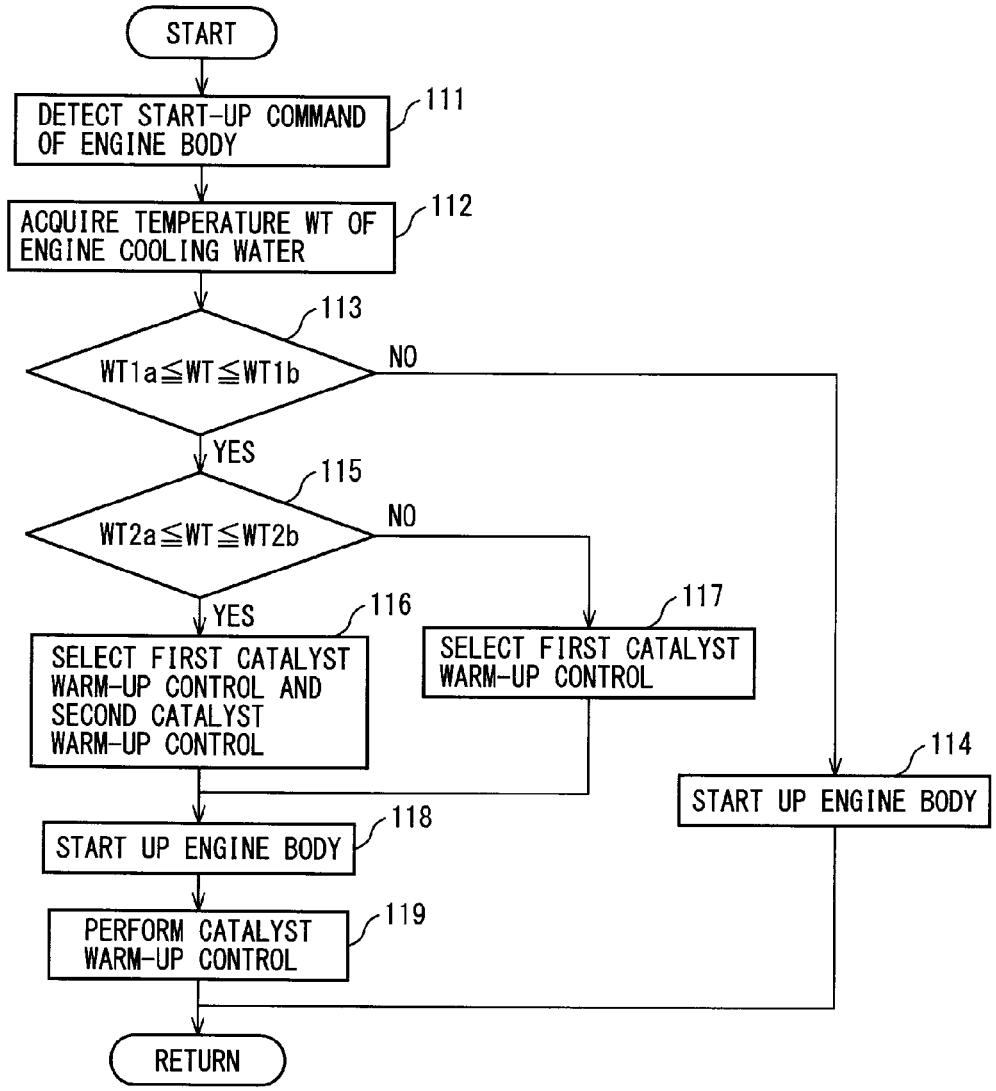
FIG. 4 is a flowchart of first operational control in an embodiment.

FIG. 4 is a flowchart of the first operational control of the present embodiment. At step 111, a start-up command of the engine body 1 is detected. For example, in the case of a cold start-up etc., a keyswitch device being changed from an off position to a movable position is detected. Alternatively, when intermittent operational control is being performed, a restart command of the engine body 1 is detected.

At step 112, the temperature WT of the engine cooling water is acquired. In the present embodiment, a temperature detector which is arranged in a flow path of the engine cooling water detects the temperature WT of the engine cooling water.

Next, at step 113, it is judged if the temperature WT of the engine cooling water is within a range of performance of the first catalyst warm-up control constituting a first temperature range. That is, it is judged if the temperature WT of the engine cooling water is not less than the temperature WT1a and not more than the temperature WT1b. When, at step 113, when the temperature WT of the engine cooling water is not within the first temperature range, the routine proceeds to step 114.

At step 114, the engine body 1 is started up in the normal operating state. That is, the engine body 1 is started up without performing the catalyst warm-up control of the present embodiment.

When, at step 113, the temperature WT of the engine cooling water is within the first temperature range, the routine proceeds to step 115. At step 115, it is judged if the temperature WT of the engine cooling water is in the second temperature range for performing the second catalyst warm-up control. When, at step 115, the temperature WT of the engine cooling water is in the second temperature range, the routine proceeds to step 116.

At step 116, the first catalyst warm-up control and second catalyst warm-up control are selected and the routine proceeds to step 118.

At step 118, the engine body is started up. At step 119, the selected first catalyst warm-up control and second catalyst warm-up control are performed. In this case, as explained above, weak stratified combustion is performed at a combustion chamber 5 and further the air-fuel ratio of the exhaust gas which flows out from the combustion chamber 5 is controlled to become rich. Further, the ignition timing is greatly retarded and the secondary air feed device 25 feeds air so as to feed high temperature exhaust gas to the exhaust purification catalyst 20.

When, at step 115, the temperature WT of the engine cooling water is not in the second temperature range, the routine proceeds to step 117. At step 117, the first catalyst warm-up control is selected, then the routine proceeds to step 118.

At step 118, the engine body is started up. At step 119, the selected first catalyst warm-up control is performed. In this case, stratified combustion is performed in the combustion chamber 5 and the air-fuel ratio of the exhaust gas is controlled to become lean. By greatly retarding the ignition timing, exhaust gas which is raised in temperature is fed to the exhaust purification catalyst 20. In this way, in the operational control of the present embodiment, the temperature of the engine cooling water can be used as the basis to select catalyst warm-up control.

Note that, regarding the end timing of the catalyst warm-up control, it is possible to end the catalyst warm-up control when the temperature of the engine cooling water reaches a predetermined judgment temperature. Alternatively, it is also possible to acquire the temperature of the exhaust purification catalyst and end the catalyst warm-up control when the acquired temperature of the exhaust purification catalyst reaches the activation temperature.

Next, the second operational control in the present embodiment will be explained. In the second operational control of the present embodiment, when the temperature of the exhaust purification catalyst 20 is acquired and the exhaust purification catalyst 20 is the activation temperature or more, control is performed to prohibit the first catalyst warm-up control and second catalyst warm-up control.

Further, in the second operational control, when the exhaust purification catalyst 20 does not reach the activation temperature, but reaches a temperature near the activation temperature and can achieve a predetermined purification rate, the first catalyst warm-up control is performed without the second catalyst warm-up control being performed. In the present invention, the region where a temperature near the activation temperature is reached and a predetermined purification rate can be achieved is called the "semiactivated region". Further, the temperature of the lower limit of this semiactivated region is referred to as the "semiactivation temperature". In the second operational control, the semiactivation temperature is preset.

Figure 5:
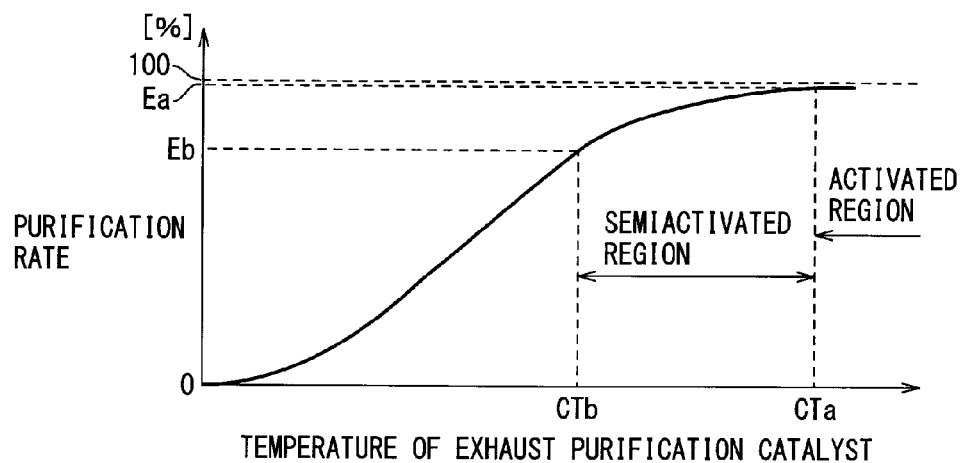
FIG. 5 is a graph which explains a purification rate with respect to a temperature of an exhaust purification catalyst.

FIG. 5 is a graph which explains the relationship of the temperature of the exhaust purification catalyst and the purification rate. The exhaust purification catalyst 20 rises in purification rate along with the rise in temperature. As the activation temperature CTa, it is possible to employ a temperature which enables a purification rate Ea at which the purification rate of the exhaust gas becomes substantially 100% to be achieved.

Further, a semiactivated region at which the purification rate does not reach substantially 100%, but can reach a relatively high purification rate is set. In the present embodiment, the region which is not less than the purification rate Eb and less than the purification rate Ea is set for the semiactivated region. Further, the temperature CTb of the exhaust purification catalyst 20 which enables the purification rate Eb to be achieved is set to the semiactivation temperature.

Figure 6:
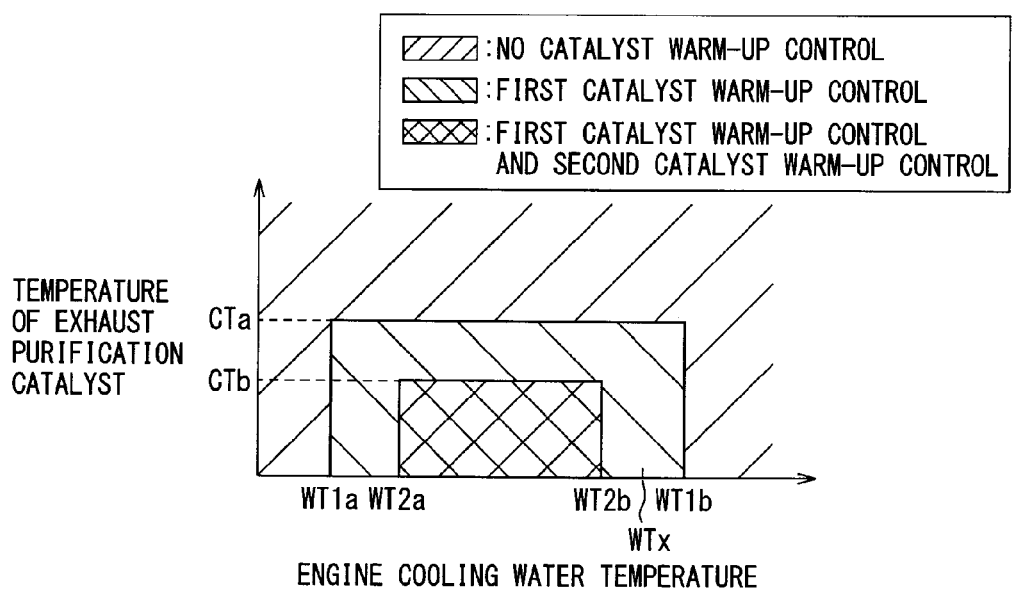
FIG. 6 is a schematic view which explains a range of performance of catalyst warm-up control in second operational control in an embodiment.

FIG. 6 is a schematic view which explains the second operational control in the present embodiment. The abscissa shows the temperature of the engine cooling water, while the ordinate shows the temperature of the exhaust purification catalyst. When the temperature WT of the engine cooling water is in a temperature region lower than the temperature WT1a and a temperature region higher than the temperature WT1b, that is, is outside a first temperature range, catalyst warm-up control is not performed in the same way as in the first operational control.

When, in the second operational control, the temperature WT of the engine cooling water is within a first temperature range, when the temperature CT of the exhaust purification catalyst 20 is the activation temperature CTa or more, control is performed to prohibit catalyst warm-up control.

For example, in a vehicle etc. which performs intermittent operational control, regardless of the exhaust purification catalyst 20 being the activation temperature or more, shutdown of the internal combustion engine causes the temperature of the engine cooling water to drop and sometimes the temperature range becoming one where the first catalyst warm-up control is performed. However, in this case, there is no need to perform catalyst warm-up control, so in the second operational control, it is possible to suppress excess warm-up of the exhaust purification catalyst 20. Further, it is possible to reduce the drive time of the secondary air feed device 25 or reduce the number of start-ups and shutdowns.

Further, when the temperature WT of the engine cooling water is within a first temperature range, if the temperature CT of the exhaust purification catalyst 20 is not less than the semiactivation temperature CTb and less than the activation temperature CTa, the first catalyst warm-up control is performed without performing the second catalyst warm-up control. For example, even when the temperature of the engine cooling water is in the second temperature range from the temperature WT2a to the temperature WT2b, if the temperature CT of the exhaust purification catalyst 20 is in the semiactivated region, the first catalyst warm-up control is used to warm up the exhaust purification catalyst 20.

When the temperature of the exhaust purification catalyst 20 is in the semiactivated region, the temperature of the exhaust purification catalyst 20 becomes close to the activation temperature and a relatively large purification rate can be achieved. For this reason, there is little need to perform both the first catalyst warm-up control and second catalyst warm-up control. It is possible to perform control to perform the first catalyst warm-up control while prohibiting the second catalyst warm-up control. Due to this control, it is possible to reduce the drive time of the secondary air feed device 25 or reduce the number of start-ups or shutdowns. Further, it is possible to reduce the amount of fuel consumption when performing the catalyst warm-up control or possible to suppress catalyst deterioration etc.

FIG. 7 shows a flowchart of the second operational control in the present embodiment. At step 111, a start-up command of the engine body 1 is detected, while at step 112, the temperature WT of the engine cooling water is acquired. Next, at step 120, the temperature CT of the exhaust purification catalyst 20 is acquired. In the present embodiment, a temperature sensor 43 is used to detect the temperature CT of the exhaust purification catalyst 20.

At step 121, it is judged if the temperature CT of the exhaust purification catalyst 20 is the activation temperature CTa or more. When, at step 121, the temperature CT of the exhaust purification catalyst 20 is the activation temperature CTa or more, the routine proceeds to step 114. In this case, the engine body 1 is started up without performing catalyst warm-up control.

At step 121, when the temperature CT of the exhaust purification catalyst 20 is less than the activation temperature CTa, the routine proceeds to step 113. At step 113, it is judged if the temperature WT of the engine cooling water is within a first temperature range. When, at step 113, the temperature WT of the engine cooling water is not within the first temperature range, the routine proceeds to step 114.

When, at step 113, the temperature WT of the engine cooling water is within the first temperature range, the routine proceeds to step 122. At step 122, it is judged if the temperature CT of the exhaust purification catalyst 20 is the semiactivation temperature CTb or more. That is, at step 122, it is judged if the exhaust purification catalyst 20 is in the semiactivated state. When, at step 122, the temperature CT of the exhaust purification catalyst 20 is the semiactivation temperature CTb or more, the routine proceeds to step 117.

At step 117, the first catalyst warm-up control is selected. Next, at step 118, the engine body is started up, then, at step 119, the selected first catalyst warm-up control is performed.

At step 122, when the temperature CT of the exhaust purification catalyst 20 is less than the semiactivation temperature CTb, the routine proceeds to step 115.

At step 115, it is judged if the temperature WT of the engine cooling water is in the second temperature range. When, at step 115, the temperature WT of the engine cooling water is not in the second temperature range, the routine proceeds to step 117 where the first catalyst warm-up control is selected.

When, at step 115, the temperature WT of the engine cooling water is in the second temperature range, the routine proceeds to step 116. At step 116, the first catalyst warm-up control and second catalyst warm-up control are selected. At step 118, the engine body is started up, then at step 119, the selected first catalyst warm-up control and second catalyst warm-up control are performed.

In this way, in the second operational control in the present embodiment, the temperature of the exhaust purification catalyst 20 can be acquired, the temperature of the exhaust purification catalyst 20 can be used as the basis to restrict performance of catalyst warm-up control, and therefore excessive performance of catalyst warm-up control can be suppressed.

In the internal combustion engine of the present embodiment, as the temperature of a part which changes along with the temperature of the exhaust purification catalyst 20, the temperature of the engine cooling water is detected. The temperature of the part with which the temperature of the exhaust purification catalyst 20 is linked, that is, the related temperature, is not limited to this. For example, the temperature of the engine body, the temperature of the exhaust gas which flows out from a combustion chamber, or another temperature of any part with which the temperature of the exhaust purification catalyst is linked may be employed.

The catalyst temperature acquisition device in the present embodiment uses the temperature sensor 43 to acquire the temperature of the exhaust purification catalyst 20, but the invention is not limited to this. The catalyst temperature acquisition device can use any device or control to acquire the catalyst temperature. For example, it is also possible to detect the temperature of the exhaust gas which flows into the exhaust purification catalyst as the temperature of the exhaust purification catalyst. Alternatively, it is also possible to use the operating state of the engine body as the basis to estimate the temperature of the exhaust purification catalyst. For example, it is possible to use the engine speed and intake air amount (or load) as the basis to estimate the rate of change of the temperature of the exhaust purification catalyst and use the estimated rate of change as the basis to estimate the current temperature of the exhaust purification catalyst.

The intermittent operational control in the present embodiment illustrates types of control which stop combustion of fuel temporarily when the vehicle is stopped, but the intermittent operational control is not limited to these. It is possible to perform any control to temporarily stop combustion of fuel.

For example, in a hybrid vehicle which is provided with drive sources constituted by an internal combustion engine and electric motor, sometimes intermittent operation is performed. In a hybrid vehicle, sometimes the operation of the engine body of the internal combustion engine is temporarily stopped in accordance with the operating state of the vehicle. For example, when a vehicle is running at a low speed, combustion of fuel in the combustion chambers is stopped and the electric motor is used to drive the axle. After this, when the demanded load increases or the amount of power stored in the battery decreases, the engine body is restarted. The operational control in the present embodiment can be applied in such a hybrid vehicle as well.

Further, the operational control in the present embodiment can be applied to an internal combustion engine which is provided with not only a fuel injector which injects fuel inside of a combustion chamber, but also a fuel injector which injects fuel into an engine intake passage. In this case, when performing homogeneous combustion in the combustion chamber, fuel can be injected into the engine intake passage. Further, in the operational control in the present embodiment, fuel is injected in the cylinder in the suction stroke of the combustion cycle, but instead of this fuel injection, fuel can be injected into the engine intake passage.

In the above controls, the order of the steps can be suitably changed within a range where the functions and actions are not changed.

In the above figures, the same or equivalent parts are assigned the same reference notations. Note that the above embodiments are illustrative and do not limit the invention. Further, in the embodiments, changes of embodiments which are shown in the claims are included.

REFERENCE SIGNS LIST 1 engine body
3 piston
3a cavity
5 combustion chamber
10 spark plug
11 fuel injector
20 exhaust purification catalyst
21 exhaust treatment device
25 secondary air feed device
27 air pump
28 air switching valve
31 electronic control unit
43 temperature sensor

The invention claimed is:

1. An internal combustion engine comprising:
a cylinder fuel injector which injects fuel to an inside of a combustion chamber;
an exhaust purification catalyst which is arranged in an engine exhaust passage;
a secondary air feed device which feeds air to the engine exhaust passage at an upstream side from the exhaust purification catalyst;
a related temperature acquisition device which acquires a related temperature which is a temperature of a part with which a temperature of the exhaust purification catalyst is linked; and
an electronic control unit; wherein
the electronic control unit is formed so as to perform first catalyst warm-up control and second catalyst warm-up control which promote a rise in temperature of the exhaust purification catalyst,
the first catalyst warm-up control includes control which injects fuel from the cylinder fuel injector in a compression stroke to make a fuel concentration around a spark plug rise and control which retards an ignition timing to make a temperature of an exhaust gas which flows out from the combustion chamber rise,
the second catalyst warm-up control includes control which feeds air to the engine exhaust passage to make components which are included in the exhaust gas oxidize and make the temperature of the exhaust gas rise,
a first temperature range of the related temperature at which the first catalyst warm-up control is performed and a second temperature range of the related temperature at which the second catalyst warm-up control is performed are preset in the electronic control unit, and
the second temperature range is set so as to be included inside the first temperature range and a range of performance of the first catalyst warm-up control is set broader than a range of performance of the second catalyst warm-up control.

2. The internal combustion engine according to claim 1, wherein
the electronic control unit is formed so as to perform intermittent operational control which temporarily stops combustion of fuel in the combustion chamber during an operating period of the internal combustion engine, and,
when intermittent operational control is used to stop, then restart combustion in the combustion chamber, if the related temperature is lower than an upper limit of the first temperature range, the electronic control unit performs the first catalyst warm-up control without performing the second catalyst warm-up control.

3. The internal combustion engine according to claim 2, wherein
a lower limit of the related temperature at which intermittent operation is performed is preset, and
the lower limit of the related temperature at which intermittent operational control is performed is set higher than an upper limit of the second temperature range.

4. The internal combustion engine according to claim 1, wherein
the related temperature is a temperature of engine cooling water,
the related temperature acquisition device includes a temperature detector which detects a temperature of the engine cooling water, and
a lower limit of the first temperature range is set lower than a lower limit of the second temperature range, while an upper limit of the first temperature range is set higher than an upper limit of the second temperature range.

5. The internal combustion engine according to claim 1, further comprising a catalyst temperature acquisition device which acquires a temperature of the exhaust purification catalyst, wherein
an activation temperature at which the exhaust purification catalyst becomes activated is preset in the electronic control unit, and
the electronic control unit prohibits the first catalyst warm-up control and second catalyst warm-up control when the exhaust purification catalyst is the activation temperature or more.

6. The internal combustion engine according to claim 1, further comprising a catalyst temperature acquisition device which acquires a temperature of the exhaust purification catalyst, wherein
an activation temperature at which the exhaust purification catalyst becomes activated and a semiactivation temperature which is lower than the activation temperature and enables a predetermined purification rate to be achieved are preset in the electronic control unit, and
the electronic control unit performs the first catalyst warm-up control without performing the second catalyst warm-up control when the related temperature is within the first temperature range and the temperature of the exhaust purification catalyst is less than the activation temperature and not less than the semiactivation temperature.

* * * * *